US006527664B2

(12) United States Patent
Hunt

(10) Patent No.: US 6,527,664 B2
(45) Date of Patent: Mar. 4, 2003

(54) LOCKING DIFFERENTIAL WITH CLUTCH ACTIVATED BY MAGNETORHEOLOGICAL FLUID

(75) Inventor: William Gordon Hunt, Roanoke, IN (US)

(73) Assignee: Spicer Technology, Inc., Fort Wayne, IN (US)

( * ) Notice: Subject to any disclaimer, the term of this patent is extended or adjusted under 35 U.S.C. 154(b) by 0 days.

(21) Appl. No.: 10/175,086

(22) Filed: Jun. 20, 2002

(65) Prior Publication Data

US 2002/0173400 A1 Nov. 21, 2002

Related U.S. Application Data

(62) Division of application No. 09/649,202, filed on Aug. 28, 2000, now Pat. No. 6,428,441.

(51) Int. Cl.⁷ .................. F16H 48/22; F16H 48/26; F16D 27/02
(52) U.S. Cl. .................. 475/231; 475/85; 192/21.5; 192/35
(58) Field of Search .................. 475/85, 198, 199, 475/200, 231, 249; 192/21.5, 35, 54.52

(56) References Cited

U.S. PATENT DOCUMENTS

| | | | |
|---|---|---|---|
| 4,679,463 A | * 7/1987 | Ozaki et al. ............ 475/231 X |
| 4,781,078 A | * 11/1988 | Blessing et al. ........ 475/249 X |
| 5,094,328 A |   3/1992 | Palmer |
| 5,156,578 A |  10/1992 | Hirota |
| 5,322,484 A | *  6/1994 | Reuter ...................... 192/21.5 |
| 5,469,947 A |  11/1995 | Azai et al. |
| 5,582,557 A | * 12/1996 | Dissett et al. ............... 475/231 |
| 5,915,513 A | *  6/1999 | Isley et al. .................... 192/35 |
| 6,077,183 A | *  6/2000 | Tar et al. ...................... 475/231 |

FOREIGN PATENT DOCUMENTS

JP   411125280 A  *  5/1999

* cited by examiner

Primary Examiner—Charles A Marmor
(74) Attorney, Agent, or Firm—Liniak, Berenato & White

(57) ABSTRACT

A limited slip differential includes a friction clutch mechanism, an electromagnetic coupling, and a camming mechanism disposed between the friction clutch mechanism and the electromagnetic coupling. The camming mechanism converts shearing forces within the electromagnetic coupling to an axial force applied to engage the clutch mechanism. The camming mechanism includes annular discs having axially inclined ramps, and a roller bearing for movement along the ramps to provide for variable spacing between the annular discs, wherein increased spacing is used to apply the axial force.

14 Claims, 2 Drawing Sheets

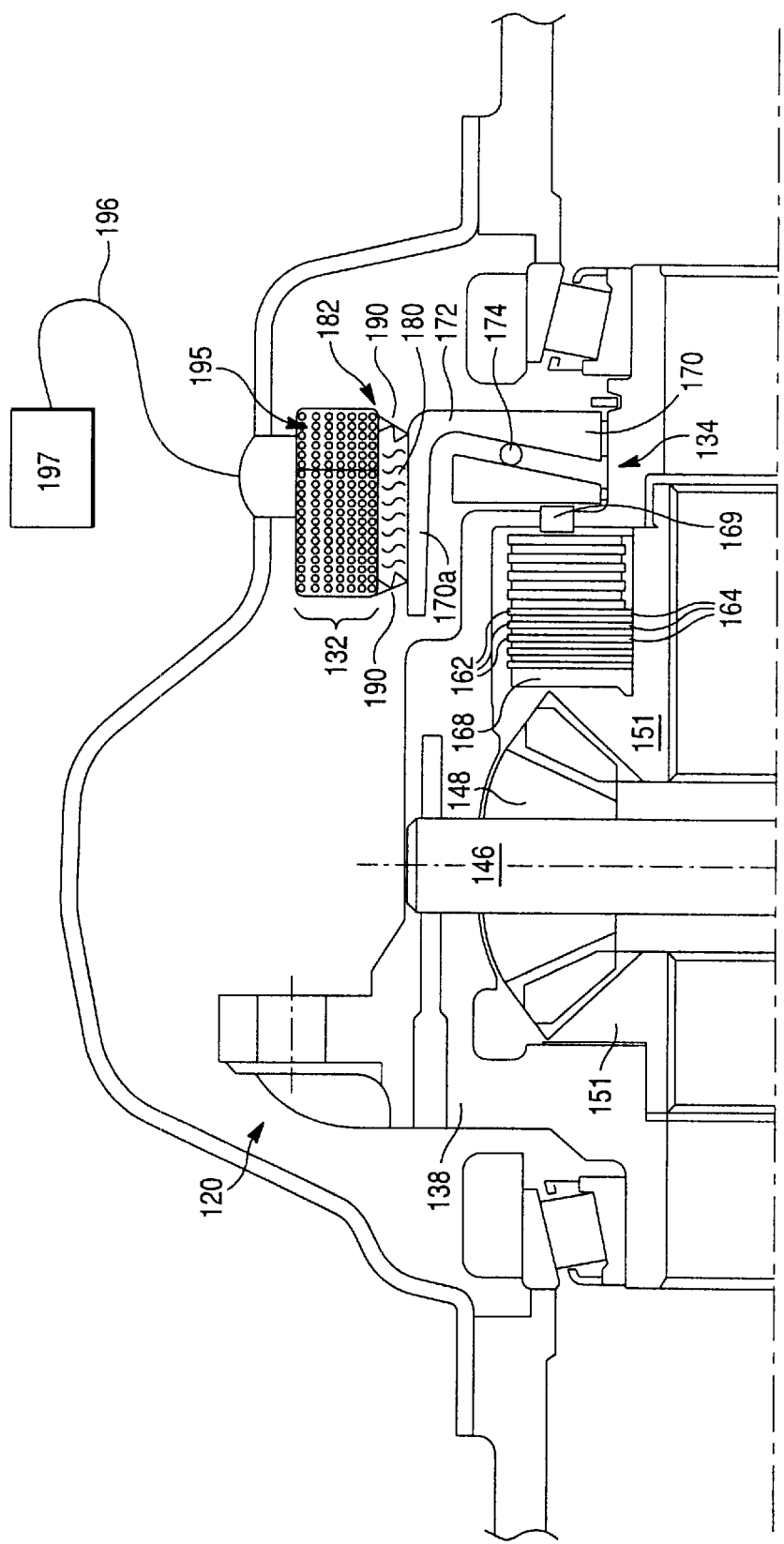

LOCKING DIFFERENTIAL WITH CLUTCH ACTIVATED BY MAGNETORHEOLOGICAL FLUID

This application is a divisional application of U.S. Ser. No. 09/649,202, filed Aug. 28, 2000.

BACKGROUND OF THE INVENTION

1. Field of the Invention

This invention relates to a limited slip differential which is actuated to limit the relative rotational speed between two driven shafts above a predetermined amount and, more particularly, to a drive line clutch having an electromagnet surrounding an annulus filled with magneto-rheological fluid.

2. Description of Related Art

Limited slip differentials are known for providing rotational drive to two output shafts. In particular, such differentials are often used to drive the axles of motor vehicles. A limited slip differential allows relative rotation between two output shafts under certain circumstances. For example, when a vehicle turns, the output shaft of the outer wheel typically turns at a higher rotational speed than the output shaft of the inner wheel. A limited slip differential allows this relative rotation. If one of the wheels begins to slip, however, the relative rotational speed between the output shafts of the two wheels exceeds a predetermined limit. A limited slip differential resists such relative rotational speed.

One known limited slip differential employs a viscous coupling which "monitors" any relative rotation between the two output shafts. When the relative rotational speed exceeds a certain limit, viscous fluid in the viscous coupling expands to create an axial force against an actuation member. In turn, the actuation member is forced against, and engages a friction clutch, directly connecting the first and second output shafts.

There are drawbacks to such prior art differentials. Relying on fluid expansion does not provide fine control over the amount of relative rotation required before clutch actuation. Further, the reliance on the expanding fluid also may not be easily controlled to allow variation of the desired limit on relative rotational speed.

Electromagnetic clutches have been developed to improve power delivery to all wheels. With an increasingly sophisticated array of vehicle condition sensors and a concomitant increase in the sophistication of computer software, it is apparent that improvements are possible in the structure and operation of electromagnetic clutches. However, conventional electromagnetic clutches suffer from poor operation and packaging problems.

The need exists for an effective and efficiently packaged electromagnetic clutch for a limited slip differential assembly.

SUMMARY OF THE INVENTION

The present invention is directed to an electromagnetic clutch assembly which provides enhanced speed of operation and improved modulating control.

The invention provides a multiple disc clutch pack having a magneto-rheological operator and a ball ramp operator.

In a disclosed embodiment of the present invention, a limited slip differential incorporates a friction clutch which is selectively actuated to directly contact two driven shafts. A viscous coupling is connected to the friction coupling by a pair of rotatable discs with inclined cam surfaces formed between the discs. Should there be an undesirable amount of relative rotational speed, the electromagnetic coupling creates a rotational shear force causing a first disc to rotate relative to the second disc. The relative rotation of the discs causes the inclined cam surfaces to move relative to each other, in turn resulting in axial movement of the second disc to engage the friction clutch.

With the inventive differential, fluid expansion is replaced by the more predictable and controllable electromagnetic coupling. Moreover, the parameters of the viscous coupling and discs may be easily varied to control the amount of relative rotational speed which is allowed prior to actuation of the friction clutch. As an example, the cam surfaces can be varied to control the desired amount of relative rotational speed.

Magneto-rheological (MR) fluids exhibit varying shear strength in response to an applied magnetic field, and the invention utilizes this property to vary the compressive force on a clutch pack contained in the differential, thereby varying the torque-biasing characteristic. The orientation and packaging of the invention minimizes the amount of MR fluid, maximizes the space available for the clutch pack, and may allow the use of a one-piece differential case casting as opposed to more costly two-piece designs.

The invention includes an electromagnet surrounding an annulus filled with MR fluid. The electromagnet is fixed to the housing, and the MR fluid is in contact with a ball-ramp mechanism that converts the shear stress of the MR fluid to a linear force that is applied to the clutch pack. Varying the electrical power to the electromagnet causes the shear strength of the MR fluid to change proportionally, thus varying the torque applied to the ball ramp mechanism and the compressive force applied to the clutch pack. With the invention, the MR fluid may be disposed external to the differential housing or contained within the differential housing.

These and other features of the present invention can be best understood from the following specification and drawings, of which the following is a brief description.

BRIEF DESCRIPTION OF THE DRAWINGS

FIG. 2 is a cross-section view of an alternate embodiment of the present invention.

DETAILED DESCRIPTION OF THE PREFERRED

Figure 1:
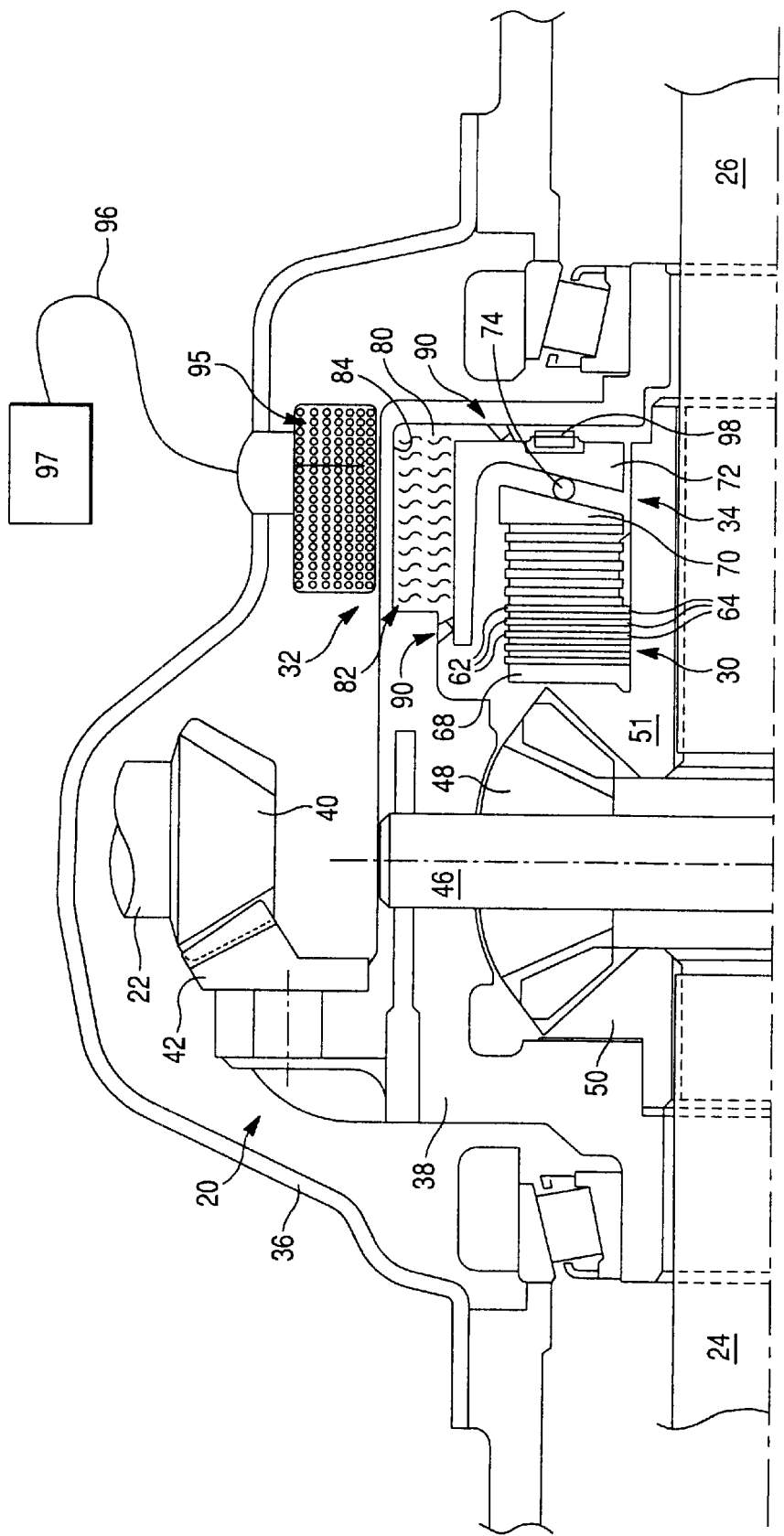
FIG. 1 is cross-sectional view of a limited slip differential according to a first embodiment of the present invention.

Referring now to the drawings, FIG. 1 illustrates a differential gear assembly 20 including an input drive shaft 22, a left output shaft 24 and a right output shaft 26. Left output shaft 24 and right output shaft 26 extend along a common output drive axis 28. The left and right directions are defined as shown in FIG. 1.

To limit the relative rotational speed between output shafts 24 and 26, differential gear assembly 20 includes a clutch mechanism 30, an electromagnetic actuator 32 and a camming mechanism 34. As will be explained, the electromagnetic actuator 32 reacts to an undesirably large relative rotational speed between output shafts 24 and 26. Camming mechanism 34 is responsive to a displacement from electromagnetic actuator 32 to provide a force to selectively engage clutch mechanism 30 and directly connect output shafts 24 and 26.

Differential gear assembly 20 is shown as a planetary differential including an outer housing 36 enclosing a rotatable one-piece differential gear case 38. Input drive shaft 22 has a drive pinion gear 40 that engages an annular ring gear 42 mounted on an outer surface of gear case 38. Driven by the gear case 38 is a pinion shaft 46. Pinion gears 48 are rotatably disposed on the pinion shaft 46, and the pinion gears 48 mates with a pair of side gears 50, 51. The side gear 50 mates with the left output shaft 24 via splines, and the side gear 51 mates with the right output shaft 26 via splines.

Clutch mechanism 30 is positioned inside gear case 38 to provide selective resistance to relative rotation between left output shaft 24 and right output shaft 26. Clutch mechanism 30 includes a plurality of clutch plates 62 slidably coupled to the gear case 38. Clutch plates 62 alternate with a plurality of intermediate clutch plates 64 which are slidably coupled to the side gear 51. Clutch plates 62, 64 are disposed to progressively limit relative rotation between the differential case 38 and the side gear 51 in a manner known in the art. At the left end of clutch mechanism 30, an annular pressure plate 68 is provided to prevent undue axial movement of clutch mechanism 30 to the left.

At the right end of clutch mechanism 30, a reaction annular disc 70 of camming mechanism 34 abuts the clutch mechanism 30. Camming mechanism 34 also includes an actuator annular disc 72 and intermediate roller bearings 74. Annular discs 70 and 72 both include a plurality of circumferentially spaced ramps (not shown in FIG. 1). Opposing ramps of each annular disc 70 and 72 have complimentary surfaces which are axially inclined along a circumferential direction. When actuator annular disc 72 rotates relative to reaction annular disc 70, roller bearings 74 move along ramps moving reaction annular disc 70 in the leftward direction. The movement of reaction annular disc 70 applies an axial force to actuate clutch mechanism 30.

FIG. 1 further illustrates an electro-resistive coupling 32 to provide a force causing movement of reaction annular disc 70. Operation of the differential assembly with electro-resistive coupling 32 is nearly identical to operation with a viscous coupling, except that an electro-rheological fluid 80, which thickens in the presence of electricity, is used to provide the shearing force. As the charge becomes stronger, the shear strength of fluid 80 increases.

Coupling 32 includes a chamber or annulus 82 defined by a conductive casing 84 formed within the differential case 38 and an outer wall of actuator annular disc 72. Seals 90 allow relative rotation of conductive casing 84 and disc 72 while sealing chamber 82 containing MR fluid 80.

To charge MR fluid 80, an electromagnetic transformer 95 provides a current to conductive casing 84. Transformer unit 95 is generally annular and produces a magnetic field which induces a current in MR fluid 80 through conductive casing 84, thus thickening MR fluid 80 and creating increased shear resistance between conductive casing 84 and disc 72. In accordance with the spirit and scope of the invention, other types of current generators may be used.

In this embodiment, a sensor system is used to externally monitor the relative rotation between left output shaft 24 and right output shaft 26. When an extreme or target difference is sensed, a charge is induced in MR fluid 80 via input line 96 delivered from a vehicle controller 97. The vehicle controller 97 includes a sensor system monitor the relative rotation of the output shafts 24,26, the sensor system induces an electrical current upon sensing relative rotation of said output shafts above a predetermined amount. The magnetorheological fluid is thereby charged to create the resistance to rotation of the coupling members.

As described, electromagnetic coupling 32 provides a force in response to relative rotational speeds between output shafts 24 and 26. As such, it could be said to provide a "signal" of undesirably high relative rotation. During vehicle operation, reaction annular disc 70 rotates directly with side gear 51, which drives right output shaft 26. Rotation is transferred from reaction annular disc 70 to tapered roller bearings 74, which actuator signal annular disc 72, which in turn rotates viscous plates 62, 64. A bearing 98 is disposed between casing 38 and actuator annular disc 72.

When a small difference in rotational speed exists, such as that occurring when a vehicle turns, electromagnetic coupling 32 does not actuate clutch mechanism 30. If the speed difference between right and left output shafts 24, 26 becomes too great, however, a shear force is created which resists the relative rotation of actuator annular disc 72 and differential case 38. Resistance to rotation caused in MR fluid 80 resists rotation of actuator annular disc 72, which then rotates relative to roller bearing 74, and reaction annular disc 70. Roller bearing 74 then rolls along ramps formed therein causing reaction annular disc 70 to be forced to the left, engaging clutch mechanism 30.

FIG. 2 illustrates an alternate embodiment of the present invention wherein the electromagnetic coupling 132 and the ball-ramp actuator 134 are disposed external to the differential case 138. The differential assembly comprises essentially the same components as described with respect to the embodiment of FIG. 1; therefore, the following description will focus on the structure and function of the clutch mechanism 130, ball-ramp actuator 134 and electromagnetic coupling 132. As with the first embodiment, the differential assembly 120 comprises a differential case 138 driving a pinion shaft 146. Pinion gears 148 are disposed on pinion shaft 146 and matingly engage side gears 150, 151, which in turn matingly engage the left and right output shafts (not shown), respectively.

As with the first embodiment, the clutch mechanism 130 consists of a series of clutch plates 164 splines onto the hub of side gear 151. A series of alternating clutch plates 162 are interleaved between the clutch plates 164 and are splined onto the differential case 138. Clutch plates 162, 164 are disposed to progressively limit relative rotation between the differential case 138 and the side gear 151 in a manner known in the art. At the left end of clutch mechanism 130, an annular pressure plate 168 is provided to prevent undue axial movement of clutch mechanism 130 to the left.

At the right end of clutch mechanism 130, a piston member 169 is disposed to abut the clutch mechanism 130. When the piston member 169 acts against the clutch plates 162, 164 of the clutch mechanism 130, the clutch mechanism 130 progressively limits relative rotation between the differential case 138 and the side gear 151.

Forming the ball-ramp actuator 134 is a reaction annular disc 170, an actuator annular disc 172 and an intermediate roller member 174. Reaction annular disc 170 of camming mechanism 134 abuts the piston member 169 adjacent the clutch mechanism 130. Annular discs 170 and 172 both include a plurality of circumferentially spaced ramps (not shown). Opposing ramps of each annular disc 170 and 172 have complimentary surfaces which are axially inclined along a circumferential direction. When actuator annular disc 172 rotates relative to reaction annular disc 170, roller bearings 174 move along ramps moving reaction annular disc 170 in the leftward direction. The movement of reaction annular disc 170 applies an axial force to actuate clutch mechanism 130 via the piston member 169. Seals or bearing are preferably disposed between the discs 170, 172 and the adjacent external radial surface of the differential case 138.

FIG. 2 further illustrates an electro-resistive coupling 132 to provide a force causing movement of reaction annular disc 170. For electro-resistive coupling 132, an electro-rheological fluid 180, which thickens in the presence of electricity, is used to provide a shearing force. As the charge in the MR fluid becomes stronger, the shear strength of fluid 180 increases.

Coupling 132 includes a chamber or annulus 182 defined between the electromagnet 195 and an annular hub 172a of the annular disc 172. The specific shape and disposition of the annular 182 may vary according to the design parameters and packaging of the differential assembly. Seals 190 allow relative rotation of electromagnet 195 and disc 172 while sealing chamber 182 containing MR fluid 180.

To charge MR fluid 180, an electromagnetic transformer 195 provides a current to MR fluid 180. Transformer unit 195 is generally annular and produces a magnetic field, which induces a current in MR fluid 180, thus thickening MR fluid 180 and creating increased shear resistance between annular 182 and disc 172. In accordance with the spirit and scope of the invention, other types of current generators may be used.

In this embodiment, a sensor system (not shown) is used to externally monitor the relative rotation between left output shaft and right output shaft. When an extreme or target difference is sensed, a charge is induced in MR fluid 180 after a signal is delivered to the electromagnet 195 via input line 196 delivered from a vehicle controller 197.

As described, electromagnetic coupling 132 provides a force in response to relative rotational speeds between the output shafts. As such, it could be said to provide a "signal" of undesirably high relative rotation. When a small difference in rotational speed exists, such as that occurring when a vehicle turns, electromagnetic coupling 132 does not actuate clutch mechanism 130. If the speed difference between right and left output shafts becomes too great, however, a shear force is created which resists the relative rotation of actuator annular disc 172 and electromagnet 195. Resistance to rotation caused in MR fluid 180 resists rotation of actuator annular disc 172, which then rotates relative to roller bearing 174, and reaction annular disc 170. Roller bearing 174 then rolls along ramps formed therein causing reaction annular disc 170 to be forced to the left, engaging clutch mechanism 130.

With the inventive differential, fluid expansion is replaced by the more predictable electromagnetic coupling as an indication of an undesirably high relative rotational speed. Moreover, the parameters of the electromagnetic coupling may be easily varied to control the amount of relative rotational speed which is allowed prior to actuation of the friction clutch. As an example, the cam surfaces can be varied to control the desired amount of relative rotational speed.

As previously discussed, magneto-rheological (MR) fluids exhibit varying shear strength in response to an applied magnetic field, and the invention utilizes this property to vary the compressive force on a clutch pack contained in the differential, thereby varying the torque-biasing characteristic. The orientation and packaging of the invention minimizes the amount of MR fluid, maximizes the space available for the clutch pack, and may allow the use of a one-piece differential case casting as opposed to more costly two-piece designs (see FIG. 1).

The invention includes an electromagnet surrounding an annulus filled with MR fluid. The electromagnet is fixed to the housing, and the MR fluid is in contact with a ball-ramp mechanism that converts the shear stress of the MR fluid to a linear force that is applied to the clutch pack. Varying the electrical power to the electromagnet causes the shear strength of the MR fluid to change proportionally, thus varying the torque applied to the ball ramp mechanism and the compressive force applied to the clutch pack. With the invention, the MR fluid may be disposed external to the differential housing or contained within the differential housing.

While the invention has been shown and described with reference to the preferred embodiments, it will be understood by those of skill in the art that various changes in form and detail may be made therein without departing from the spirit and scope of the instant invention.

What is claimed is:

1. A limited slip differential assembly comprising:
   an input member;
   a first output shaft;
   a second output shaft coaxial with said first output shaft, said first and second output shafts rotating about an output drive axis;
   a differential interposed between said input member and said first and second output shafts, said differential transmitting rotation from said input member to said first and second output shafts and providing rotation of said first output shaft relative to said second output shaft;
   a clutch mechanism, said clutch mechanism providing resistance to relative rotation between said first output shaft and said second output shaft;
   an electromagnetic coupling having a first and second coupling members, said first and second coupling members defining a chamber having a magnetorheological fluid, said magnetorheological fluid increasing in density when charged by an electrical current, said magnetorheological fluid providing resistance to rotation of said first coupling member relative to said second coupling member;
   means for inducing said electrical current in said magnetorheological fluid; and
   a camming mechanism for engaging said clutch mechanism, said camming mechanism including a first disc associated with said coupling, and a second disc associated with said clutch mechanism, each of said first and said second discs having an inclined surface formed between said first and second discs, said inclined surfaces being axially inclined along a circumferential direction relative to said output drive axis, said means for inducing said electrical current being actuated in response to a predetermined amount of relative rotation between said first output shaft and said second output shaft, said coupling thereby creating a resistance to rotation of said first disc relative to said second disc, the resistance to rotation causing said first disc to rotate relative to said second disc, said inclined surfaces camming to result in an axial force actuating said clutch mechanism,
   wherein said electromagnetic coupling is disposed radially outside said camming mechanism and disposed external to a differential case housing a pinion shaft, pinion gears and side gears.

2. The differential assembly as recited in claim 1, wherein said first coupling member is integrally formed to concurrently function as said first disc.

3. The differential assembly as recited in claim 1, wherein second coupling member is integrally formed with said means for inducing said electrical signal.

4. The differential assembly as recited in claim 1, wherein said camming mechanism actuates a piston member interposed between said camming mechanism and said clutch mechanism.

5. The differential assembly as recited in claim 4, wherein said piston member passes through said differential case.

6. The differential assembly as recited in claim 1, wherein a rotating member is received between said inclined surfaces of said first and second discs of said camming mechanism.

7. The differential assembly as recited in claim 6, wherein said rotating member is a circular roller bearing.

8. The differential assembly as recited in claim 6, wherein said rotating member is a tapered roller bearing, said roller bearing having a varying cross-section along a radial direction with respect to said roller bearing, said inclined surfaces of said first and second discs being dimensioned to conform to the shape of said roller bearing.

9. The differential assembly as recited in claim 1, wherein said differential assembly further includes:

a sensor system monitoring the relative rotation of said first output shaft and said second output shaft, said sensor system actuating said means for inducing said electrical current upon sensing relative rotation of said first output shaft and said second output shaft above said predetermined amount.

10. A limited slip differential comprising:

an input member;

a first output shaft;

a second output shaft;

a differential interposed between said input member and said first and second output shafts, said differential transmitting rotation from said input member to said first and second output shafts and providing rotation of said first output shaft relative to said second output shaft;

a clutch mechanism for directly connecting said first output shaft and said second output shaft to provide resistance to relative rotation between said first output shaft and said second output shaft;

an electromagnetic coupling having first and second coupling members, said first and second coupling members defining an annular chamber having an magnetorheological fluid, said magnetorheological fluid increasing in density when charged by an electrical current, said magnetorheological fluid providing resistance to rotation of said first coupling member and said second coupling member, wherein said coupling is disposed external to a differential case housing a pinion shaft, pinion gears and side gears;

means for inducing said electrical current in said magnetorheological fluid, said means including a transformer adjacent one of said first and second coupling members, said transformer inducing said electrical current to charge said magnetorheological fluid; and a camming mechanism for engaging said clutch mechanism, said camming mechanism providing a force to engage said clutch mechanism, said camming mechanism being responsive to a resistance to rotation of said first coupling member relative to said second coupling member of said coupling;

a sensor system monitor the relative rotation of said first output shaft and said second output shaft, said sensor system actuating said means for inducing said electrical current upon sensing relative rotation of said first output shaft and said second output shaft above a predetermined amount, said magnetorheological fluid thereby being charged to create the resistance to rotation of said first and second coupling members of said coupling, wherein said annular chamber circumscribes said camming mechanism.

11. The differential assembly as recited in claim 10, wherein said first coupling member is integrally formed to concurrently function as said first disc.

12. The differential assembly as recited in claim 10, wherein second coupling member is integrally formed with said means for inducing said electrical signal.

13. The differential assembly as recited in claim 10, wherein said camming mechanism actuates a piston member interposed between said camming mechanism and said clutch mechanism.

14. The differential assembly as recited in claim 13, wherein said piston member passes through said differential case.

* * * * *